United States Patent

Yokogi

[11] Patent Number: 6,129,335
[45] Date of Patent: Oct. 10, 2000

[54] FLOW RATE REGULATION APPARATUS FOR AN EXHAUST DUCT IN A CYLINDER CABINET

[75] Inventor: Kazuo Yokogi, Hyogo-ken, Japan

[73] Assignee: l'Air Liquide, Societe Anonyme pour l'Etude et l'Exploitation des Procedex Georges Claude, Paris, France

[21] Appl. No.: 09/201,767

[22] Filed: Dec. 1, 1998

[30] Foreign Application Priority Data

Dec. 2, 1997 [JP] Japan ................................. 9-332220

[51] Int. Cl.[7] .................................................. F16K 31/44
[52] U.S. Cl. ...................................... 251/212; 137/486
[58] Field of Search ............................. 137/486, 376; 251/212

[56] References Cited

U.S. PATENT DOCUMENTS

| | | | |
|---|---|---|---|
| 132,617 | 10/1872 | Allen | 251/212 |
| 1,713,833 | 5/1929 | Kochendorfer | 137/486 |
| 2,723,615 | 11/1955 | Morris et al. | 137/486 |
| 2,960,155 | 11/1960 | Bartz | 137/486 |
| 3,196,900 | 7/1965 | Catheron et al. | 137/486 |
| 4,625,627 | 12/1986 | Livanos et al. | 98/32 |
| 4,665,938 | 5/1987 | Brown et al. | 137/486 |
| 5,986,240 | 12/1986 | Schmitt et al. | 219/391 |

OTHER PUBLICATIONS

Coghlan, Concentric Variable Conduction valve, IBM Technical Disclosure Bulletin vol. 21, No. 2 pp. 587–588, Jul. 1978.

*Primary Examiner*—Pamela Wilson
*Assistant Examiner*—Ken B. Rinehart
*Attorney, Agent, or Firm*—Burns, Doane, Swecker & Mathis, L.L.P.

[57] ABSTRACT

The present invention provides a flow rate regulation apparatus capable of accurately measuring the flow velocity of air flowing through an exhaust duct and carrying out a flow rate regulation with high precision, though said exhaust duct may be short in length. The flow rate regulation apparatus according to the present invention comprises a means for regulating the sectional area of a passage in an exhaust duct, where the passage is formed at the center of said exhaust duct and said passage is shaped to be symmetrical with respect to the center axis AX of said exhaust duct as a basis. Since the passage formed in the exhaust duct by the passage sectional area regulation means is shaped so as to be symmetrical, no turbulence takes place in an air current flowing along the center axis AX of the exhaust duct. Flow velocity can be accurately determined and maintained by using air velocity measurements along the center axis.

4 Claims, 3 Drawing Sheets

FLOW RATE REGULATION APPARATUS FOR AN EXHAUST DUCT IN A CYLINDER CABINET

BACKGROUND OF THE INVENTION

1. Field of the Invention

The present invention relates to a casing in which a gas container is to be accommodated, referred to as a cylinder cabinet. More specifically, the present invention relates to an apparatus for regulating the flow rate of an air current flowing through an exhaust duct of such a cylinder cabinet.

2. Description of the Prior Art

A special material gas for use in the manufacture of semiconductors is usually used as stored in a portable gas container which is called a gas bomb or gas cylinder. As to such special material gases for use in the manufacture of semiconductors, there are many dangerous gases having combustibility (explosiveness), toxicity, and corrosiveness, and hence they must be used with thoughtful consideration of safety aspects. Accordingly, a gas container filled with a dangerous special material gas has been hitherto accommodated in a casing, which is referred to as a cylinder cabinet, thereby coping with an unforeseen gas leakage.

The cylinder cabinet itself functions to prevent a gas from spreading to the atmosphere, the inside of which is normally ventilated so that a leaked gas can be diluted and safely exhausted therefrom. Accordingly, a cylinder cabinet generally has an air in-take port formed in its lower portion and an exhaust duct provided in its upper portion. Further, this exhaust duct is connected with a main exhaust duct disposed on a building. On the outlet end of said main exhaust duct is fixed an air exhaust fan. If said exhaust fan is driven, the in side of the main exhaust duct will draw air in, whereby air is taken from the air in-take port into the cylinder cabinet and caused to flow through the main exhaust duct by way of the exhaust duct.

Although one is obligated to carry out normal exhaust procedures in a cylinder cabinet in accordance with the relevant laws, it is very important from a safety standpoint that such normal exhaust is carried out at a proper ventilation ratio or ventilation volume depending on the kind of gas used. In the case of a combustible gas such as monosilane, for instance, it is necessary that the ventilation be carried out by introducing air in an amount equal to 10 times the volume of the cylinder cabinet every minute. Further, in the case of a toxic gas, for the purpose of preventing such a gas from leaking from a cylinder cabinet to the atmosphere, ventilation will be carried out so that the flow velocity of an air current at the air in-take port is in the range of from 0.5~1 m/sec.

Since the amount of ventilation must be changed depending on the kind of gas to be handled, as mentioned above, it has been hitherto devised that a damper for the flow rate regulation is generally provided in an exhaust duct of the cylinder cabinet.

In general, the exhaust ducts of plural cylinder cabinets are connected to a main exhaust duct. When the exhaust air quantity of, for example, one cylinder cabinet is changed, the pressure of said main exhaust duct varies so that the exhaust air quantity of the other cylinder cabinets should be also changed. Therefore, one approach would be to provide, in a cylinder cabinet, an exhaust sensor for detecting a deviation in the exhaust air quantity from its management or expected value when said deviation takes place. In order to detect this exhaust deviation or abnormality, it is preferable that the air velocity in a duct be measured and the deviation of said air velocity from its management value, which is determined in each of the cylinder cabinets for the kinds of gases accommodated therein, be ascertained. However, there has been hitherto adopted, for economic and technical reasons, a method of estimating an exhaust abnormality indirectly by detecting a pressure difference between the inner and outer pressures of a duct by a fine differential pressure sensor, not by an air velocity sensor. In the prior art, accordingly, a portable air velocity sensor has been separately brought in at every stage where some abnormality in the differential pressure takes place, thereby measuring the air velocity in the duct, and then regulating the damper on the basis of this air velocity data so that a desired exhaust quantity can always be maintained.

In the prior art, a damper provided in an exhaust duct is generally of the butterfly type (which involves rotating a disc to open or close a passage). In the case of a butterfly damper, it is necessary, in order to measure a flow velocity accurately, that a current meter be disposed a distance of ten times the inner diameter of the exhaust duct from the damper. However, the entire length of an exhaust duct in itself is generally shorter then such a distance as it may be less than ten times as large as the inner diameter thereof. Therefore, a current meter can not be disposed at a position sufficiently separate from the dampers. As a result, the precision of the measurement is low and the exhaust air quantity is apt to be unstable.

It is therefore an object of the present invention to provide a flow rate regulation apparatus for an exhaust duct, in which the aforementioned problems can be solved.

SUMMARY OF THE INVENTION

In order to achieve the aforementioned purposes, there is provided by the present invention a flow rate regulation apparatus comprising a passage sectional area regulation means for regulating the sectional area of a passage in an exhaust duct, where said passage is formed at the center of said exhaust duct and said passage is shaped so as to be symmetrical with respect to the center axis of said exhaust duct as a basis. This passage sectional area regulation means is preferably comprised of a pair of quarter-spherical damper members pivotably mounted in said exhaust duct and a drive source for driving said damper members.

Since the passage formed in the exhaust duct by the passage sectional area regulation means is shaped so as to be symmetrical, as mentioned above, no turbulence is caused to take place in an air current flowing along the center axis of the exhaust duct. By measuring the flow velocity along the center axis, accordingly, the flow rate of an air current or amount of exhaust air can be accurately determined from the flow velocity measurement value and the sectional area of the passage.

In order to carry out a feedback control so that the flow rate of air is kept constant, the flow rate regulation apparatus according to the present invention preferably further comprises a current meter disposed so that the flow velocity measuring portion thereof is positioned in said exhaust duct downstream of said passage sectional area regulation means, and on the center axis of said exhaust duct. The apparatus further comprises a control means for controlling said passage sectional area regulation means on the basis of the measurement results of said current meter.

DETAILED DESCRIPTION OF THE PREFERRED EMBODIMENTS

Figure 1:
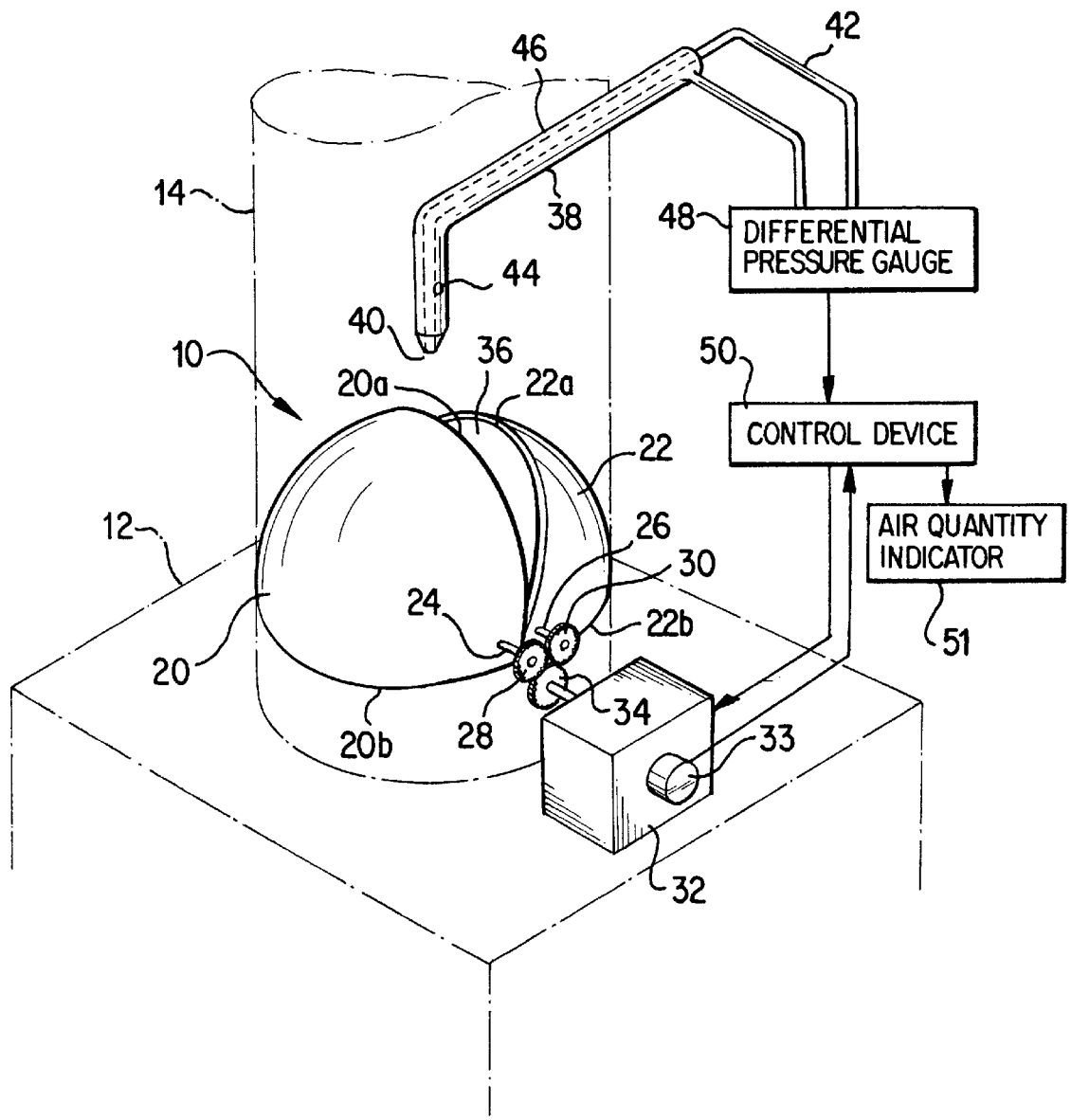
FIG. 1 is a perspective view roughly showing the flow rate regulation apparatus according to the present invention.

Now referring to the drawings, a preferred embodiment of the present invention will be described here in detail. In the drawing, the same numeral is assigned to the same or corresponding items. More specifically, the following reference numerals have been used:

10—flow rate regulation apparatus; 12—cylinder cabinet; 14—exhaust duct; 20, 22—damper members (a passage sectional area regulation means); 32—drive source; 36—passage; 38—Pitot static pressure tube (a current meter); 48—differential pressure gauge; 50—control device (control means).

Figure 2A:
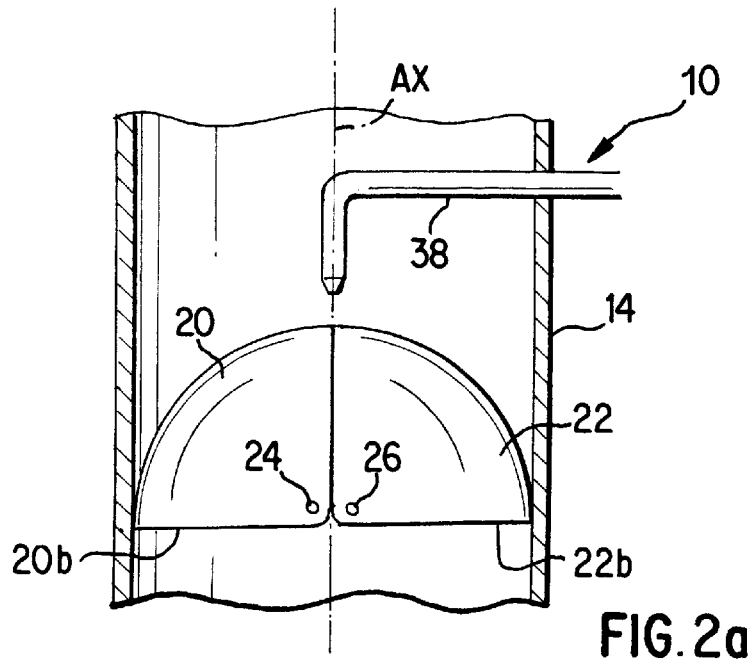
FIG. 2(a) to (c) each is a vertical cross-sectional view showing the relation of the position of the damper members in the flow rate regulation apparatus illustrated in FIG. 1 and the passage formed between the damper members.
Figure 2B:
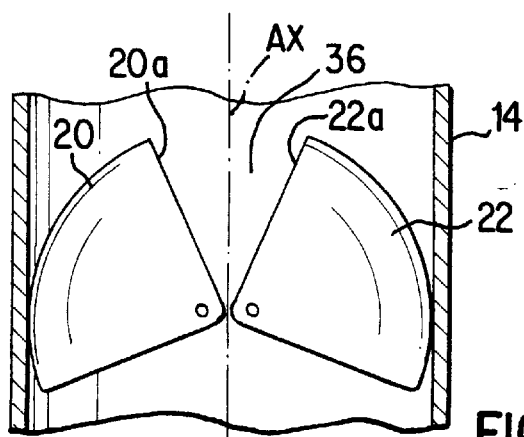
Figure 2C:
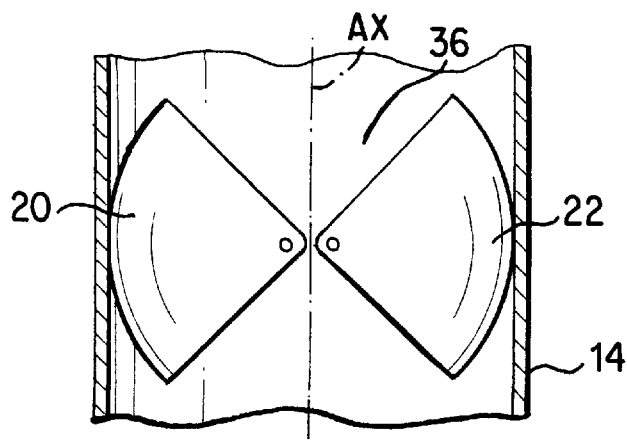
Figure 3A:
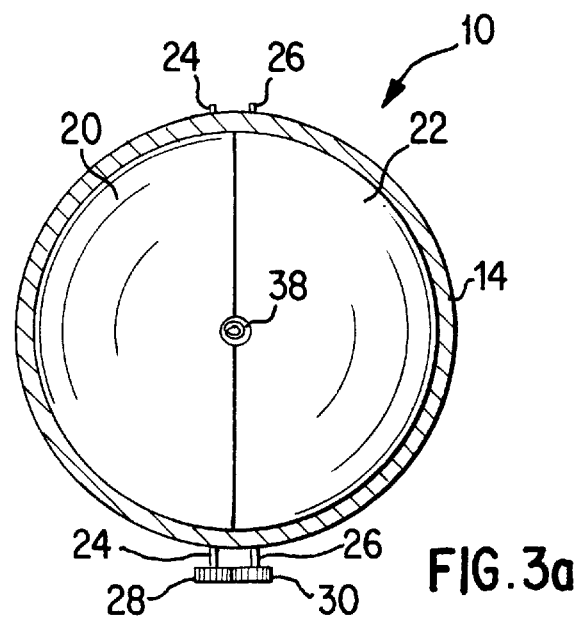
FIG. 3(a) to (c) each is a horizontal cross-sectional view showing the relation of the position of the damper members in the flow rate regulation apparatus illustrated in FIG. 1 and the passage formed between the damper members, and these views correspond to FIG. 2(a) to (c), respectively.
Figure 3B:
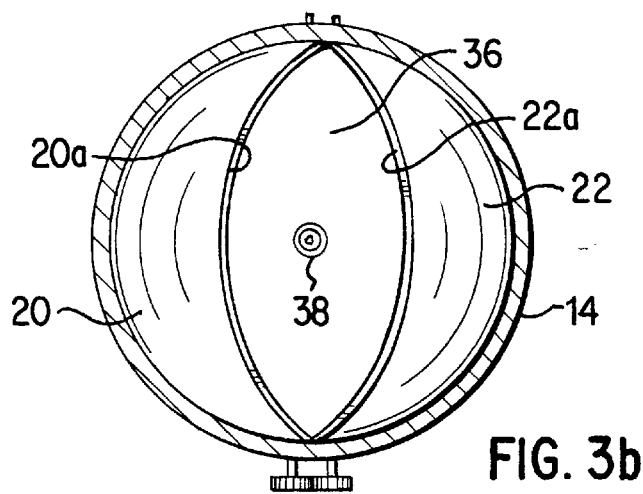
Figure 3C:
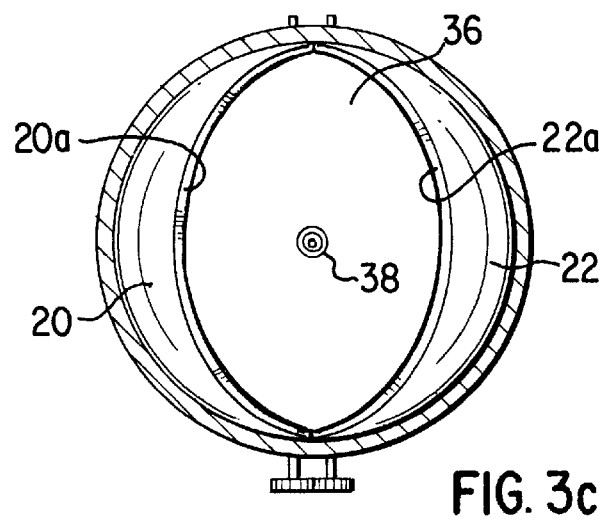

FIG. 1 to FIG. 3 show one embodiment of a flow rate regulation apparatus 10 according to the present invention. As shown in FIG. 1, this flow rate regulation apparatus 10 is provided in an almost cylindrical exhaust duct 14 secured on the upper plate of a cylinder cabinet 12. The cylinder cabinet 12 is a casing for accommodating a gas container (not shown), in which a special gas such as silane series gas is stored, and it is assembled with stainless steel sheets. In the lower portion of said cylinder cabinet 12 is formed an air in-take port (not shown), where air taken in from said port is permitted to flow through the cylinder cabinet 12, and is discharged through the exhaust duct 14. Although not illustrated, the exhaust duct 14 is connected to a main exhaust duct disposed in a building, the outlet end of which is open to the atmosphere by way of a scrubber (which is a harmful substances eliminator) and an exhaust fan. The suction of air for ventilation use will be effected by driving this exhaust fan.

The flow rate regulation apparatus 10 comprises a pair of damper members 20, 22 shaped in a quarter-spherical form (this is a form obtained by equivalently dividing a sphere into four parts). These damper members 20, 22 are formed from a metal sheet by press working, and the radius of its outer face is made to be substantially equal to the radius of the inner face of the exhaust duct 14. On the intersection portions where the edges 20a, 22a of the respective damper members 20.22 intersect with the edges 20b, 22b thereof, there are respectively provided a shaft 24 and a shaft 26, each protruding outwards. Each of these shafts 24, 26 penetrate through a hole formed in the wall face of the exhaust duct 14, and supports the respective damper member 20, 22 pivotably. Further, the damper members 20, 22 are accommodated in the exhaust duct 14 as the respective edges 20a, 22a thereof can be brought into contact with each other. At least one of these shafts 24, 26 of the respective damper members 20, 22 has a gear 28 or 30 attached thereon and these adjacent gears 28, 30 are engaged with each other. With one of these gears 30 is engaged a gear 34 of a drive source 32 such as a motor. If one gear 30 is rotated by actuating this drive source 32, accordingly, the damper members 20, 22 will be pivotably moved in the mutually opposite directions. FIG. 2(a) to (c) and FIG. 3(a) to (c) each shows a situation where the damper members 20, 22 are pivotably moved. As can be seen from these drawings, the passage 36 formed between the damper members 20, 22 varies in sectional area correspondingly to the pivotal position of the damper members 20, 22. Further, on the drive shaft of the drive source 32 is secured an encoder 33 for measuring the angle of rotation thereof, and its signals will be input into the input portion of a control device 50 such as a microcomputer. The signals of said encoder 33 correspond to the angle of rotation of said drive shaft, and this angle of rotation of the drive shaft corresponds to the pivot position of the damper members 20, 22. On the basis of a signal corresponding to the pivot position of the damper members output from the encoder 33, accordingly, the control device 50 can calculate the sectional area of the passage 36 formed between the damper members 20, 22.

In the exhaust duct 14 downstream of the damper members 20, 22 is a current meter 38. Although various types of meters can be used as said current meter 38, the illustrated current meter 38 is a Pitot static pressure tube. The Pitot static pressure tube 38 is composed of an inner tube 42 having an air inlet port 40 formed at its end and an outer tube 46 surrounding said inner tube 42 and having a static pressure hole 44 formed on its side, where the flow velocity of air is measured from a difference in pressures within both the inner and outer tubes 42, 46, which is generated by having air flow toward the air inlet port 40 at the end. The end portion of this Pitot static pressure tube 38, which is the flow velocity measuring portion, is arranged so that its center axis accords with the center axis AX of the exhaust duct 14.

Referring to FIG. 2 and FIG. 3, it can be seen from these figures of the drawing that the passage 36 formed between the damper members 20, 22 is formed at the center of the exhaust duct 14 and shaped so as to be symmetrical with respect to the center axis AX as a basis. In an air current running along the edges 20a, 22b of the damper members 20, 22, some turbulence would take place, but an air current flowing along the center axis AX becomes nearly an ideal current. So far as the flow velocity measuring portion is arranged on the center axis AX, it is enabled to measure a flow velocity with high precision, even if the position of said flow velocity measuring portion is in the vicinity of the damper members 20, 22.

The inner tube 42 and outer tube 46 of said Pitot static pressure tube 38 are connected with a differential pressure gauge 48, and this differential pressure gauge 48 is connected with the input portion of the control device 50. The control device 50 will seek a flow velocity of an air current flowing along the center axis AX of the exhaust duct 14, on the basis of a measurement of the differential pressure by the differential pressure gauge 48. The control device is constructed such that the exhaust air quantity Q [m$^3$/min] can be obtained by calculating, in the microcomputer of the control device 50, the following equation on the basis of the flow velocity V [m/sec] and the sectional area F [m$^2$] of the passage 36 between the damper members 20, 22 sought by a signal from the encoder 33:

$$Q = 60 V \cdot F$$

The exhaust air quantity Q sought in accordance with this equation can be also displayed in an air quantity indicator 51.

The output portion of the control device 50 is connected with said drive source 32 so that the motion of this drive source 32 can be controlled. Since the position of the damper members 20, 22 is generally determined depending on the motion situation of the drive source 32, the control device 50 ought to always grasp the sectional area of said passage 36 formed between the damper members 20, 22. In the construction of the present invention, as mentioned above, the flow velocity of an air current flowing along the center of the exhaust duct 14 can be accurately measured, and hence the control device 50 can seek the flow rate of the air current or the exhaust air amount from the cylinder cabinet 12 with higher precision from the flow velocity measurement values and the measured sectional area of the passage between the damper members 20, 22. In the case where the flow rate of an air current flowing through the exhaust duct 14 varies, due to any reason, the control device 50 would recognize that variation from a change in the measurement values of the flow velocity and would accordingly conduct a feedback control of the drive source 32 to change the position of the damper members 20, 22, whereby it is enabled to keep the flow rate of the air current or the exhaust air amount a constant.

Although the preferred embodiment of the present invention has been described in detail above, it goes without saying that the present invention is not limited only to the aforementioned embodiment. For instance, a hot wire current meter or an electromagnetic current meter can be used, even though the current meter 38 in the aforementioned embodiment is described as a Pitot static pressure tube. In a case where such other current meter is used, it is necessary, as a matter of course, to arrange the flow velocity measuring portion thereof (for example, a hot wire in the case of a hot wire current meter) along the center axis AX of the exhaust duct 14.

With regard to said means for regulating the sectional area of the passage, it is not necessary to use only said quarter-spherical damper members 20, 22, if the means used is means such that a passage 36 is formed at the center of the exhaust duct 14 and shaped so as to be symmetrical with respect to the center axis AX. It is also possible to use, for example, such a construction as the diaphragm mechanism of a camera. Furthermore, it is not always necessary to conduct a feedback control of the drive source 32 in accordance with the exhaust air quantity data. Namely, if a person makes only an inching operation of said drive source 32 through the operation of a manual push button (not shown), while confirming by visual observation the exhaust air quantity displayed in the air quantity indicator 51, such that a deviation between the exhaust air quantity of the cylinder cabinet 12 and its management value can be manually regulated, one is enabled to conduct an extremely accurate damper regulation, as compared with a damper regulation which has been hitherto carried out at random whereby the exhaust air quantity can not be ascertained.

According to the present, invention, as has been described, a variable passage formed in an exhaust duct by the passage sectional area regulation means is symmetrical with respect to the center axis of the exhaust duct, and hence an air current flowing along said center axis becomes stable. By positioning the measuring portion of the current meter along on the center axis, accordingly, the flow velocity of the air current can be accurately measured even if the position of said measuring portion is in the vicinity of the passage sectional area regulation means. Thus, even if the entire length of the exhaust duct is short, it is still possible to carry out a feedback control to maintain the exhaust air quantity constant on the basis of the air flow velocity.

What is claimed is:

1. A gas cylinder cabinet system, comprising a gas cylinder cabinet accommodating a gas cylinder therein, an exhaust duct connected to the gas cylinder cabinet for exhausting a gas from the cabinet, and an exhaust gas flow rate regulation apparatus connected to said gas cylinder cabinet, wherein said regulation apparatus comprises a passage sectional area regulation means for regulating said sectional area of a passage in said exhaust duct, said passage being formed at the center of said exhaust duct and said passage being shaped so as to be symmetrical with respect to the central axis of said exhaust duct as a basis.

2. A gas cylinder cabinet system, according to claim 1, wherein said passage sectional area regulation means is comprised of a pair of quarter-spherical damper members pivotably mounted in said exhaust duct, and a drive source for driving said damper members.

3. A gas cylinder cabinet system, according to claim 1, which further comprises a current meter disposed in the exhaust duct so that the flow velocity measuring portion thereof is positioned in said exhaust duct downstream of said passage sectional area regulation means and on the center axis of said exhaust duct; and a control means for controlling said passage sectional area regulation means on the basis of the measurements of said current meter.

4. A gas cylinder cabinet system, according to claim 2, which further comprises a current meter disposed in the exhaust duct so that the flow velocity measuring portion is positioned in said exhaust duct downstream of said passage sectional area regulation means and on the center axis of said exhaust duct; and a control means for controlling said passage sectional area regulation means on the basis of the measurements of said current meter.

* * * * *